(12) United States Patent
Snyder

(10) Patent No.: US 6,924,243 B2
(45) Date of Patent: *Aug. 2, 2005

(54) HIGH PERFORMANCE FIRE-RETARDANT KRAFT FACING FOR FIBERGLASS INSULATION

(75) Inventor: James G. Snyder, Granville, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 177 days.

This patent is subject to a terminal disclaimer.

(21) Appl. No.: 10/191,873

(22) Filed: Jul. 9, 2002

(65) Prior Publication Data

US 2002/0179265 A1 Dec. 5, 2002

Related U.S. Application Data

(63) Continuation-in-part of application No. 09/867,260, filed on May 29, 2001, now abandoned.

(51) Int. Cl.$^7$ .......................... B32B 27/12; B32B 27/10
(52) U.S. Cl. ...................... 442/149; 442/150; 442/412; 442/414; 428/516; 428/509; 428/511; 162/136; 52/404; 52/406.1; 156/298
(58) Field of Search .................. 442/149, 150, 442/412, 414; 428/516, 509, 511; 162/136; 52/404, 406.1; 156/298

(56) References Cited

U.S. PATENT DOCUMENTS

| | | | |
|---|---|---|---|
| 3,955,031 A | | 5/1976 | Jones et al. |
| 4,016,234 A | * | 4/1977 | Warren et al. .............. 264/129 |
| 4,701,359 A | | 10/1987 | Akao |
| 4,726,985 A | * | 2/1988 | Fay et al. .................... 428/138 |
| 4,736,567 A | * | 4/1988 | Pienta ....................... 53/135.3 |
| 4,882,892 A | * | 11/1989 | Pienta ......................... 53/176 |
| 5,160,788 A | * | 11/1992 | Feinberg ..................... 428/344 |

(Continued)

FOREIGN PATENT DOCUMENTS

WO   WO 02/096641   12/2002

OTHER PUBLICATIONS http://www.wconline.com/CDA/ArticleInformation/coverstory/BNPCoverStoryItem/0,3296,85808,00.html Oct. 2002.*

(Continued)

*Primary Examiner*—D. Lawrence Tarazano
(74) *Attorney, Agent, or Firm*—Inger H. Eckert; Maria C. Gasaway

(57) ABSTRACT

A process for preparing a fiberglass insulation product, including the steps of: (a) providing a layer of fire-retardant kraft paper, (b) coating the fire-retardant kraft paper layer with from 2 to 10 pounds of HDPE or of polypropylene per 3000 square feet of the paper to form an HDPE-fire-retardant kraft laminate or a polypropylene-fire-retardant kraft laminate, (c) coating the HDPE-fire-retardant kraft or polypropylene-fire-retardant kraft laminate with from 3 to 10 pounds of LDPE per 3000 square feet of the HDPE-fire-retardant kraft laminate or polypropylene-fire-retardant kraft laminate to form an LDPE-HDPE-fire-retardant kraft laminate or an LDPE-polypropylene-fire-retardant kraft laminate, (d) adjusting the temperature of the LDPE-HDPE-fire-retardant kraft laminate or the LDPE-polypropylene-fire-retardant kraft laminate so that the LDPE becomes tacky while the HDPE or polypropylene remains solid, (e) providing a layer of fiberglass wool, and (f) contacting the LDPE layer of the LDPE-HDPE-fire-retardant kraft laminate or of the LDPE-polypropylene-fire-retardant kraft laminate with the fiberglass wool layer with pressure and cooling to bond the LDPE-HDPE-fire-retardant kraft laminate or LDPE-polypropylene-fire-retardant kraft laminate to the fiberglass wool layer to form a fiberglass insulation product.

13 Claims, 1 Drawing Sheet

U.S. PATENT DOCUMENTS

| | | | |
|---|---|---|---|
| 5,723,020 A | * 3/1998 | Robinson et al. | 162/159 |
| 5,746,854 A | 5/1998 | Romes et al. | |
| 5,804,020 A | 9/1998 | Akao et al. | |
| 5,890,591 A | * 4/1999 | Pienta | 206/410 |
| 5,891,553 A | * 4/1999 | Hendrix et al. | 428/209 |
| 5,902,684 A | * 5/1999 | Bullard et al. | 428/515 |
| 5,976,682 A | * 11/1999 | Eichbauer | 428/213 |
| 6,128,884 A | * 10/2000 | Berdan et al. | 52/742.12 |
| 6,153,544 A | * 11/2000 | Radwanski et al. | 442/153 |
| 6,191,057 B1 | * 2/2001 | Patel et al. | 442/398 |
| 6,264,031 B1 | * 7/2001 | Pienta et al. | 206/410 |
| 6,265,082 B1 | * 7/2001 | Dunham et al. | 428/500 |
| 6,361,875 B1 | * 3/2002 | Karaoglu et al. | 428/515 |
| 6,402,470 B1 | * 6/2002 | Kvasnak et al. | 416/97 R |
| 6,436,557 B1 | * 8/2002 | Moriuchi et al. | 428/689 |
| 6,492,010 B1 | * 12/2002 | Karaoglu et al. | 428/213 |
| 6,495,245 B1 | * 12/2002 | Karaoglu et al. | 428/213 |
| 6,815,380 B2 | * 11/2004 | Snyder | 442/180 |
| 2001/0031329 A1 | * 10/2001 | Shaffer | 428/36.9 |
| 2002/0179265 A1 | * 12/2002 | Snyder | 162/137 |
| 2002/0182964 A1 | * 12/2002 | Snyder | 442/394 |
| 2002/0182965 A1 | * 12/2002 | Snyder | 442/394 |
| 2003/0049986 A1 | * 3/2003 | Qureshi et al. | 442/221 |
| 2003/0157358 A1 | * 8/2003 | Arthurs et al. | 428/551 |

OTHER PUBLICATIONS http://www.fortifiber.com/FBSG/other_solutions_products.htm (2003).*

* cited by examiner

# HIGH PERFORMANCE FIRE-RETARDANT KRAFT FACING FOR FIBERGLASS INSULATION

CROSS REFERENCE TO RELATED APPLICATION

This application is a continuation in part of U.S. patent application Ser. No. 09/867,260 filed May 29, 2001 now abandoned, which is incorporated by reference in its entirety.

TECHNICAL FIELD AND INDUSTRIAL APPLICABILITY OF THE INVENTION

This invention relates to improvements in the art of manufacturing thermal insulation batts.

This invention provides process for preparing a fiberglass insulation product. The process of this invention includes the steps of: (a) providing a layer of fire-retardant kraft paper, (b) coating the fire-retardant kraft paper layer with a high melting point film such as high density polyethylene (HDPE) or of polypropylene to form an HDPE-fire-retardant kraft laminate or a polypropylene-fire-retardant kraft laminate, (c) coating the HDPE-fire-retardant kraft laminate with a low melting point film such as low density polyethylene (LDPE) to form an LDPE-HDPE-fire-retardant kraft laminate or an LDPE-polypropylene-fire-retardant kraft laminate, (d) adjusting the temperature of the LDPE-HDPE-fire-retardant kraft laminate or the LDPE-polypropylene-fire-retardant kraft laminate so that the LDPE becomes tacky while the HDPE or polypropylene remains solid, (e) providing a layer of fiberglass wool, and (f) contacting the LDPE layer of the LDPE-HDPE-fire-retardant kraft laminate or of the LDPE-polypropylene-fire-retardant kraft laminate with the fiberglass wool layer to bond the LDPE-HDPE-fire-retardant kraft laminate or LDPE-polypropylene-fire-retardant kraft laminate to the fiberglass wool layer to form a fiberglass insulation product.

BACKGROUND OF THE INVENTION

Thermal insulation batts are often comprised of a relatively thick layer of low density bulk insulating material, such as fiberglass wool, faced with for instance asphalt-coated kraft paper facing. The asphalt coating is used both to adhere the layer of thermal insulation to the facing and also to provide vapor barrier properties to the paper. Alternatively, foil-backed paper can be attached to the fiberglass wool with a thin coat of asphalt. Another approach to vapor retardance is to apply a separate 4- to 6-mil polyethylene film over installed insulation. Guardian Fiberglass, Inc. produces a polypropylene scrim kraft for insulation applications.

Such insulation products are generally provided in the form of continuous lengths (packaged as rolls) or of individual panels, or batts, with facing materials on one or both major surfaces to enable the insulation product to be handled more easily and to be fastened in position for insulating purposes, and to minimize dusting of the fiberglass fibers within the insulation product. In most instances, the provision of a facing that forms a vapor barrier is desirable in order to prevent water vapor passing through the insulation product and condensing on a cold surface.

Facing materials may be adhered to the fiberglass fiber blanket in a number of ways. For example, solvent-based or water-based adhesives or hot-melt adhesives may be applied to the facing material or to the surface of the fiberglass wool blanket, with the fiberglass wool blanket and the facing material then being brought together to surface bond the two materials. Alternatively, the facing material itself may be rendered adhesive before application to the fiberglass wool blanket. For example, a thermoplastic material such as a synthetic polymer or a bituminous layer on one surface of the facing material may be heat softened for that purpose. However, the heat treatment of polyethylene—the most commonly used synthetic polymer in this context—may destroy any water vapor barrier properties it possesses.

A product which has met with some commercial success is a kraft paper/polyethylene vapor barrier manufactured by Owens Corning, which is bonded via the polyethylene to a glass wool blanket. A more sophisticated product consists of an aluminum foil/kraft paper vapor barrier adhesively bonded on its kraft paper surface to a glass wool blanket. However, the aluminum foil incorporated as the vapor barrier renders it much more expensive.

The organization known as ASTM has published—under the designation E 96-00 (published July 2000)—a description of test methods to determine water vapor transmission of materials through which the passage of water vapor may be of importance, such as paper and other sheet materials. Those test methods permit the determination of PERM values for the sheet materials. The PERM values reflect the water vapor transmission and permeance of the materials.

Many conventional insulation facing products fail to consistently meet PERM requirements. PERM values greater than 1.0 are considered unacceptable for the purposes of the present invention.

Fire retardant facing material is also used on insulation products. Typical fire retardant facings consist of foil skim Kraft paper; a Kraft paper facing with a thin foil bonded to it. However, these facing materials are expensive, they require specialized adhesives and a very controlled manufacturing process to produce.

There is a need for an insulation product having a flexible kraft laminate which is inexpensive and fire retardant.

SUMMARY OF THE INVENTION

The present invention provides a fire-retardant kraft facing for fiberglass insulation that consistently meets PERM requirements.

One embodiment of the present invention is a flexible planar laminate comprising an external support layer of fire-retardant kraft paper to which is adhered a central vapor barrier layer of high density polyethylene (HDPE) or polypropylene, to which is adhered an internal adhesive layer of low density polyethylene (LDPE). The flexible planar laminate preferably comprises from 2 to 10 pounds, most preferably 7 pounds, of HDPE and from 3 to 10 pounds, most preferably 5 pounds, of LDPE per ream (3000 square feet) of fire-retardant kraft paper having a weight of 30 to 50 lbs/ft$^2$. In the flexible planar laminate of this invention, the softening point of the LDPE is from 25 to 125° F. and preferably from 25 to 75° F. lower than the softening point of the HDPE. When polypropylene is used as the barrier layer, the softening point of the LDPE is 25 to 150° F. and preferably from 25 to 75° F. lower than the softening point of the polypropylene.

Another embodiment of the present invention is a process for preparing a fiberglass insulation product. This process involves: (a) providing a layer of fire-retardant kraft paper, (b) coating the fire-retardant kraft paper layer with from 2 to 10 pounds of HDPE or of polypropylene per 3000 square feet of said paper to form an HDPE-fire-retardant kraft laminate, (c) coating the HDPE-fire-retardant kraft or PP-fire-retardant kraft laminate with from 3 to 10 pounds of LDPE per 3000 square feet of said HDPE-fire-retardant kraft or PP-fire-retardant kraft laminate to form an LDPE-HDPE (or PP)-fire-retardant kraft laminate, (d) adjusting the temperature of the LDPE-HDPE (or PP)-fire-retardant kraft laminate, e.g. with an infra-red heater, a microwave heater, or a rotating hot roll, so that the LDPE becomes tacky while the HDPE or PP remains solid, (e) providing a layer of fiberglass wool, and (f) contacting the LDPE layer of the LDPE-HDPE (or PP)-fire-retardant kraft laminate with the fiberglass wool layer with pressure and cooling to bond said LDPE-HDPE (or PP)-fire-retardant kraft laminate to said fiberglass wool layer to form a fiberglass insulation product.

Still another embodiment of the present invention is a fiberglass insulation product comprising a layer of fiberglass wool and a flexible planar laminate as described above.

Embodiment

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

DETAILED DESCRIPTION AND PREFERRED EMBODIMENTS OF THE INVENTION

Figure 1:
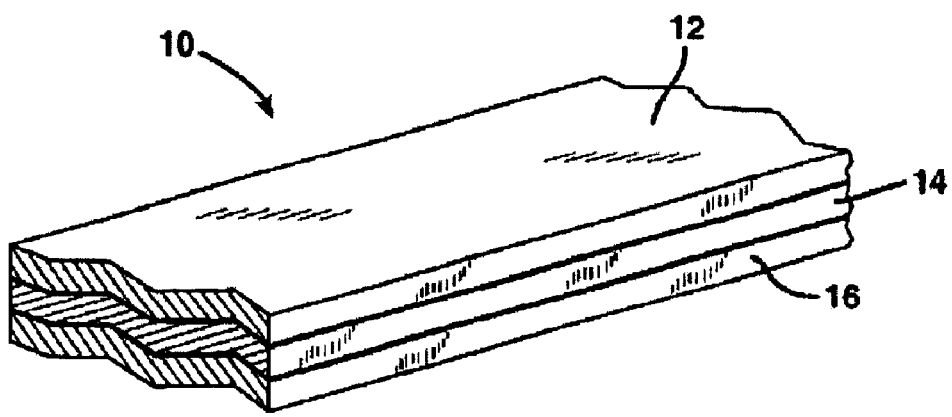
FIG. 1 is a perspective view (not to scale) illustrating a facing sheet in accordance with the present invention.
Figure 2:
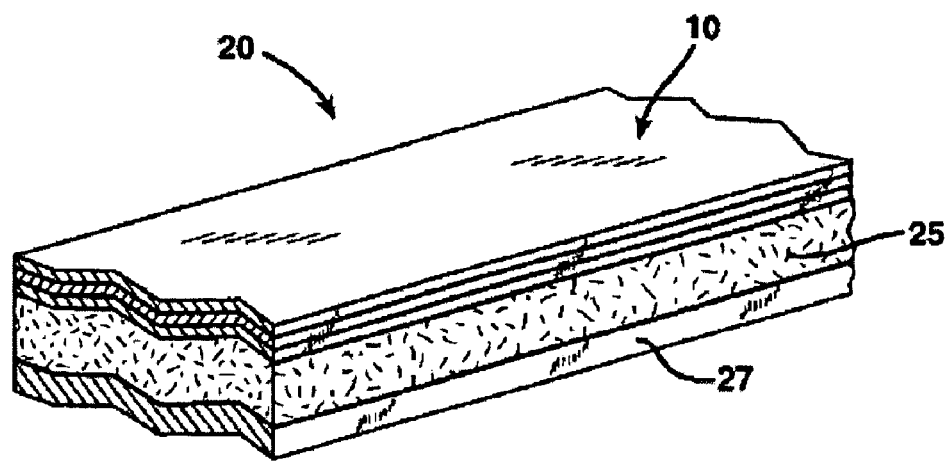
FIG. 2 is a perspective view (not to scale) illustrating an insulation product in accordance with the present invention.

As illustrated in FIG. 1, impermeable facing material 10 of this invention may comprise a fire-retardant kraft paper layer 12, a high density polyethylene layer 14, and a low density polyethylene layer 16. As illustrated in FIG. 2, insulation product 20 of this invention may comprise an impermeable facing material layer 10 (where layer 10 comprises fire-retardant kraft paper, HDPE, and LDPE), a fiberglass wool layer 25, and a permeable fire-retardant kraft paper layer 27.

Fire-Retardant Kraft Paper

The paper component in the present invention is preferably fire-retardant kraft paper because of its ready availability and low cost, its inherent strength and durability, and its ability to be readily laminated to the preferred polyethylene films. The fire-retardant kraft paper suitably has a thickness corresponding to a weight of 30 to 50 lbs/3000 ft$^2$, preferably 35 to 40 lbs/3000 ft$^2$. In a preferred embodiment, specification, 38# to 40# basis weight, more preferably 38# basis weight, Natural Utility Flame Resistant Kraft paper (Wausau-Mosinee Paper Corporation, Mosinee, Wis.) are used. Foil and foil scrim Kraft paper may also be used, provided it is pre-treated with a fire retardant material. Of course, fire-retardant kraft paper is itself susceptible to printing, for example in order to carry product information.

HDPE or PP

The specific density of HDPE is approximately 0.94. The high density polyethylene film component of the present invention suitably has a thickness corresponding to a weight of 10 to 50 g/m$^2$, preferably 25 to 35 g/m$^2$. This thickness is generally sufficient to prevent penetration by individual fibers of the fibrous fiberglass wool blanket and thereby retain the vapor-barrier characteristics of the product while avoiding the addition of unnecessary weight to the insulation product. When polypropylene is used as the barrier layer, it is used in generally the same amount or slightly less than the amount of HDPE.

LDPE

The specific density of LDPE is approximately 0.9235. The low density polyethylene film component of the present invention suitably has a thickness corresponding to a weight of 5 to 40 g/m$^2$, preferably 15 to 25 g/m$^2$. This thickness is generally sufficient to provide adhesion to the fibrous fiberglass wool blanket.

Fiberglass

The fiberglass wool blanket may comprise any one or more of the materials traditionally used for making fiberglass wool insulation products, although other mineral wool insulation materials, such as slag or basalt, could be used. In the context of the present invention, however, fibrous glass is preferred. When a fibrous glass blanket is used for forming the insulation products of the invention, it is preferred that the fibrous glass blanket contains a binder, for example a phenolic resin binder, suitably applied to the fibers immediately after fiberization.

The Insulation Product

In a preferred aspect of the invention, low density polyethylene is applied to the high density polyethylene face of a fire-retardant kraft paper/HDPE laminate, which is then heated to a temperature of 90 to 150° C., for example approximately 110° C. This elevated temperature serves to soften the low density polyethylene, thereby rendering the LDPE more susceptible to direct bonding with the fibers of the fiberglass wool blanket. This heating step may be carried out by subjecting the coated facing to radiant heat, for example by conveying it past an infrared heater, or by passing it over a heated roller, for example an oil filled roller, or by any combination of these.

Following application of the LDPE to the facing material and following any optional heating step, the facing material is applied to the fiberglass wool blanket. The assembled facing/fiberglass wool blanket is then compressed to ensure adhesion of the fiberglass wool blanket to the facing material and to force a portion of the LDPE into the thickness of the fiberglass wool blanket. In this manner, adhesion of the facing to the glass wool becomes more than just a surface contact phenomenon and a far stronger and more durable insulation product is formed.

The degree of compression to which the assembly of fiberglass wool blanket and facing material is subjected for enhancing adhesion will depend upon the density and compressibility of the fiberglass wool blanket and the degree of LDPE penetration required relative to the amount of LDPE applied. In this respect, since a fibrous glass blanket containing binder generally has a greater fiber density at its surface than in its interior as a result of its loft being set in the binder curing oven, some compression of the blanket will be necessary in most cases to force the LDPE through the more dense surface layer of fiber towards the interior of the blanket for good bonding. Generally, all that will be required to provide satisfactory enhancement of adhesion is to compress the assembly to approximately 50 to 95% of its uncompressed thickness. Such compression can be applied between an upper roller and a lower roller or conveyor surface. Alternatively, it can be provided by passing the assembly of fiberglass wool blanket and facing material under tension around a roller surface. Clearly, it is not required or desired to retain the fiberglass wool blanket in a compressed state for any significant period of time since it is undesirable for the LDPE to dry or cure while the blanket is in a compressed state. Indeed, all that is required is that the LDPE should be forced to penetrate into the thickness of the blanket and that the LDPE is then permitted to dry or cure with the blanket in its recovered state.

The fiberglass wool blanket preferably has a thickness of approximately 20 to 330 mm and a bulk density of 8 to 40 kg/m$^3$ (0.4 to 2.5 pcf).

Following its release from compression, the blanket may be cut immediately into individual insulation batts. Preferably, however, the LDPE is first permitted to completely dry and/or cure (or at least to almost completely dry and/or cure so as to avoid slippage between the fiberglass wool blanket and the facing material) and the blanket can then be cut into individual batts which may then be folded and/or compressed and packaged for storage and transportation. Alternatively, the blanket may be rolled up under compression and packaged for storage and transportation. Generally, the LDPE will require only a few seconds to dry and/or cure to the stage where it is no longer tacky, especially at the slightly elevated temperatures prevailing in the vicinity of the heating roller referred to above. The cured blanket or batt may be compressed to the usual degree.

At the intended site of installation, the compressed and packaged insulation product may be unpacked and allowed to recover its original thickness and then utilized in any one of a number of insulating situations.

EXAMPLES

Example 1

A layer of fire-retardant kraft paper weighing 38 pounds per ream was coated with HDPE at a rate of 7 pounds per ream of said paper to form an HDPE-fire-retardant kraft laminate. The HDPE-fire-retardant kraft laminate was coated with LDPE at a rate of 5 pounds per ream of said HDPE-fire-retardant kraft laminate to form an LDPE-HDPE-fire-retardant kraft laminate. The temperature of the LDPE-HDPE-fire-retardant kraft laminate was adjusted so that the LDPE became tacky while the HDPE remained solid. A layer of fiberglass wool was provided. The LDPE layer of the LDPE-HDPE-fire-retardant kraft laminate was contacted with the fiberglass wool layer under pressure and was then cooled to bond said LDPE-HDPE-fire-retardant kraft laminate to said fiberglass wool layer to form a fiberglass insulation product.

Circular specimens of the LDPE-HDPE-fire-retardant kraft laminate, having a diameter of 146±1 mm, were prepared. For each sample, four test dishes were provided. Three of the test dishes were filled to the top with calcium chloride desiccant. One of the test specimen dish assemblies has no desiccant and is used as a dummy to compensate for variations due to temperature or barometric pressure or both. One test specimen was placed in each of the four test dishes such that the edge of the test specimen rested on the recessed lip. A specimen centering ear template was positioned on each test specimen such that it was centrally located. Hot wax was applied to the test specimen area that was exposed around the outside edge of the specimen centering ear template. Once the wax was cooled, the specimen centering ear template was removed. The test dish assemblies were then placed into reclosable poly bags or a desiccator while awaiting weighing. The test dish assemblies were then each weighed to the nearest 0.0001 gram. The test dish assemblies were then placed into a test chamber operating at 23±0.6° C. The date, time (to the nearest 5 minutes), temperature (to the nearest 0.1 decrees C.), relative humidity (to 0.5%), and barometric pressure (to nearest 0.1 kPa) were recorded. Each test dish assembly was weighed daily until a constant weight gain was attained. A constant weight gain occurs when the differences between successive weighings are within 1%.

First the rate of water vapor transmission (G/t) was calculated, using a mathematical least squares regression analysis of the weight change (modified by the weight change of the dummy specimen) as a function of time, in grams/h. Then the water vapor transmission for individual specimens was calculated using the equation $WVT=(G/t)/A$ where WVT is water vapor transmission rate, g/h·m$^2$, G is weight change in grams, t is time during which the weight gain occurred in hours, and A is the test area (test dish mouth area) in square meters.

The results for the three specimens were 0.3727, 0.4410, and 0.3932, for an average of 0.4023, well under the target maximum of 1.0.

Example 2

A layer of fire-retardant kraft paper weighing 38 pounds per ream was coated with HDPE at a rate of 5 pounds per ream of said paper to form an HDPE-fire-retardant kraft laminate. The HDPE-fire-retardant kraft laminate was coated with LDPE at a rate of 4 pounds per ream of said HDPE-fire-retardant kraft laminate to form an LDPE-HDPE-fire-retardant kraft laminate. The temperature of the LDPE-HDPE-fire-retardant kraft laminate was adjusted so that the LDPE became tacky while the HDPE remained solid. A layer of fiberglass wool was provided. The LDPE layer of the LDPE-HDPE-fire-retardant kraft laminate was contacted with the fiberglass wool layer under pressure and was then cooled to bond said LDPE-HDPE-fire-retardant kraft laminate to said fiberglass wool layer to form a fiberglass insulation product.

Circular specimens of the LDPE-HDPE-fire-retardant kraft laminate, having a diameter of 146±1 mm, were prepared. For each sample, four test dishes were provided. Three of the test dishes were filled to the top with calcium chloride desiccant. One of the test specimen dish assemblies has no desiccant and is used as a dummy to compensate for variations due to temperature or barometric pressure or both. One test specimen was placed in each of the four test dishes such that the edge of the test specimen rested on the recessed lip. A specimen centering ear template was positioned on each test specimen such that it was centrally located. Hot wax was applied to the test specimen area that was exposed around the outside edge of the specimen centering ear template. Once the wax was cooled, the specimen centering ear template was removed. The test dish assemblies were then placed into reclosable poly bags or a desiccator while awaiting weighing. The test dish assemblies were then each weighed to the nearest 0.0001 gram. The test dish assemblies were then placed into a test chamber operating at 23±0.6° C. The date, time (to the nearest 5 minutes), temperature (to the nearest 0.1 decrees C), relative humidity (to 0.5%), and barometric pressure (to nearest 0.1 kPa) were recorded. Each test dish assembly was weighed daily until a constant weight gain was attained. A constant weight gain occurs when the differences between successive weighings are within 1%.

First the rate of water vapor transmission (G/t) was calculated, using a mathematical least squares regression analysis of the weight change (modified by the weight change of the dummy specimen) as a function of time, in grams/h. Then the water vapor transmission for individual specimens was calculated using the equation WVT=(G/t)/A where WVT is water vapor transmission rate, g/h·m$^2$, G is weight change in grams, t is time during which the weight gain occurred in hours, and A is the test area (test dish mouth area) in square meters.

The results for the three specimens were 1.1669, 0.5309, and 1.1199, for an average of 0.9392, under the target maximum of 1.0.

Example 3

The LDPE-bearing facing material of Example 1 is passed over a heating roll and thereby brought to a temperature of approximately 110° C. and immediately contacted with a fibrous glass blanket having a width of 1.2 m, a thickness of 280 mm, and a density of approximately 11.0 kg/m$^3$. The resulting insulation assembly is immediately compressed against the heating roll by a roller to a thickness of 210 mm.

20 m downline of the roller, the resulting insulation assembly is chopped in the transverse direction by a blade into lengths of insulation material having a size of 1.2 m by 5.5 m. The 5.5 m lengths of insulation product are immediately rolled and compressed to a thickness of 30 mm and packaged for storage and transportation.

The insulation material produced as described above has a robust structure which is resistant to repeated handling, and the facing cannot be separated from the fibrous glass blanket without destroying the whole structure of the material.

What is claimed is:

1. A process for preparing a fiberglass insulation product which comprises the steps of:
   (a) providing a layer of fire-retardant kraft paper,
   (b) coating the fire-retardant kraft paper layer with a high melting point polymer to form a high melting point polymer-fire-retardant kraft laminate,
   (c) coating the high melting point polymer-fire-retardant kraft laminate with a low melting point polymer to form a low melting point polymer-high melting point polymer-fire-retardant kraft laminate,
   (d) adjusting the temperature of the low melting point polymer-high melting point polymer-fire-retardant kraft laminate so that the low melting point polymer becomes tacky while the high melting point polymer remains solid,
   (e) providing a layer of fiberglass wool, and
   (f) contacting the low molting point layer of the low melting point polymer-high melting point polymer-fire-retardant kraft laminate with the fiberglass wool layer with pressure and cooling to bond said low melting point polymer-high melting point polymer-fire-retardant kraft laminate to said fiberglass wool layer to form a fiberglass insulation product.

2. The process of claim 1 wherein said high melting point polymer is high density polyethylene (HDPE) or polypropylene.

3. The process of claim 2 wherein said low melting paint polymer is low density polyethylene (LDPE).

4. The process of claim 3 which comprises the steps of:
   (b) coating the fire-retardant kraft paper layer with from 2 to 10 pounds of HDPE or polypropylene per 3000 square feet of said paper to form the HDPE-fire-retardant kraft laminate or polypropylene-fire-retardant kraft laminate, and
   (c) coating the HDPE-fire-retardant kraft laminate or polypropylene-fire-retardant kraft laminate with from 3 to 10 pounds of LDPE per 3000 square feet of said HDPE-fire-retardant kraft laminate or polypropylene-kraft laminate to form the LDPE-HDPE-kraft laminate or LDPE-polypropylene-fire-retardant kraft laminate.

5. The process of claim 1 wherein the temperature is adjusted with an infra-red heater, a microwave heater, or a rotating hot roll.

6. A fiberglass insulation product comprising a layer of fiberglass wool and a flexible planar laminate comprising in sequence an external support layer of fire-retardant kraft paper to which is adhered a central vapor barrier layer of high density polyethylene (HDPE) or polypropylene to which is adhered an internal adhesive layer of low melting point polymer.

7. The fiberglass insulation product of claim 6 wherein the high melting polymer is high density polyethylene (HDPE) or polypropylene.

8. The fiberglass insulation product of claim 7 wherein the low melting point polymer is low density polyethylene (LDPE).

9. The fiberglass insulation product of claim 8 in which the flexible planar laminate comprises from 2 to 10 pounds of HDPE and from 3 to 10 pounds of LDPE per 3000 square feet of fire-retardant kraft paper having a weight of 30 to 50 lbs/ft$^2$.

10. The fiberglass insulation product of claim 7 in which the flexible planar laminate comprise 7 pounds of HDPE and 5 pounds of LDPE per 3000 square feet of fire-retardant kraft paper having a weight of 30 to 50 lbs/ft$^2$.

11. A fiberglass insulating product consisting essentially of:
   a flexible planar laminate including, in sequence,
      a layer of kraft paper, the kraft paper having an outer surface and an inner surface,
      a vapor barrier layer consisting essentially of a high melting point polymer provided on the inner surface of the kraft paper, and
      an adhesive layer consisting essentially of a low melting point polymer provided on the vapor barrier layer, and
   a layer of fiberglass wool having an inner surface and an outer surface, the inner surface being adhered to the adhesive layer.

12. A fiberglass insulating product according to claim 11, further consisting essentially of:
   a second layer of kraft paper, the second layer of kraft paper being adhered to the outer surface of the layer of fiberglass wool.

13. A fiberglass insulating product according to claim 11, further consisting essentially of:
   a second flexible planar laminate including, in sequence,
      an adhesive layer consisting essentially of a low melting point polymer adhered to the outer surface of the layer of fiberglass wool,
      a vapor barrier layer provided on the adhesive layer opposite the layer of fiberglass wool, and
      a layer of kraft paper having an outer surface and an inner surface, wherein the inner surface contacts the vapor barrier layer.

* * * * *

UNITED STATES PATENT AND TRADEMARK OFFICE
CERTIFICATE OF CORRECTION

PATENT NO.     : 6,924,243 B2
DATED          : August 2, 2005
INVENTOR(S)    : Snyder It is certified that error appears in the above-identified patent and that said Letters Patent is hereby corrected as shown below:

Column 7,
Line 50, "molting" should be -- melting --.
Line 60, "paint" should be -- point --.

Signed and Sealed this

Eighteenth Day of April, 2006

JON W. DUDAS
*Director of the United States Patent and Trademark Office*